(12) United States Patent
Farwell et al.

(10) Patent No.: US 6,276,476 B1
(45) Date of Patent: Aug. 21, 2001

(54) RIGHT HAND DRIVE STEERING SYSTEM AND CONVERSION METHOD FROM LEFT HAND DRIVE VEHICLE

(75) Inventors: Joseph J. Farwell, Fort Wayne; Robert J. Haverstick, Leo; Lee A. Williams; Derek R. Scheetz, both of Fort Wayne; Bruce C. Noah, West Lafayette; John A. Budzik, Leo; Robert W. Hammond, Lafayette, all of IN (US)

(73) Assignee: International Truck and Engine Corporation, Chicago, IL (US)

( * ) Notice: Subject to any disclaimer, the term of this patent is extended or adjusted under 35 U.S.C. 154(b) by 0 days.

(21) Appl. No.: 09/529,044

(22) PCT Filed: Dec. 22, 1999

(86) PCT No.: PCT/US99/30842

§ 371 Date: Apr. 5, 2000

§ 102(e) Date: Apr. 5, 2000

(87) PCT Pub. No.: WO00/37299

PCT Pub. Date: Jun. 29, 2000

Related U.S. Application Data

(60) Provisional application No. 60/113,445, filed on Dec. 23, 1998.

(51) Int. Cl.[7] ........................................................ B62D 1/22
(52) U.S. Cl. ............................ 180/78; 180/322; 280/775; 280/93.51; 74/493
(58) Field of Search ..................................... 180/322, 321, 180/323, 78, 90; 280/771, 774, 775, 93.502, 93.503, 93.514, 93.515, 93.51; 74/493, 552, 492, 495

(56) References Cited

FOREIGN PATENT DOCUMENTS

| | | | |
|---|---|---|---|
| 8822806-A | * | 4/1989 | (AU) . |
| 050929-A | * | 5/1982 | (EP) . |
| 61-24668-A | * | 2/1986 | (JP) . |
| 63-93672-A | * | 4/1988 | (JP) . |
| WO-90/15747-A | * | 12/1990 | (WO) . |

* cited by examiner

Primary Examiner—Eric Culbreth
Assistant Examiner—F. Zeender
(74) Attorney, Agent, or Firm—Jeffrey P. Calfa; Dennis Kelly Sullivan; Gilberto Hernandez

(57) ABSTRACT

A right-hand drive vehicle steering system (10) that may be factory built or converted from a left-hand drive steering system or vice versa. The method of conversion begins with the removal of the left-hand drive steering components. A left-hand drive designed steering gear is engaged to an adapter bracket (50). The adapter bracket allows the orientation of the left-hand drive designed steering gear to remain the same in a right-hand drive installation as when installed in the left-hand drive. As a result, the pitman arm (18) that directs the wheel direction of steering and is outboard of the steering gear for left-hand drive applications, is inboard of the steering gear for right-hand drive applications. The adapter bracket allows displacement of the steering column and associated steering equipment to further outboard in the right-hand drive system relative to the outboard position in left-hand drive applications. The adapter bracket allows pitman arm operation through an operating slot (51) in spite of the location of the pitman arm between the steering gear and the frame rail (103). The adapter bracket and steering gear are mounted to the frame rail. The pitman arm is pivotably connected to a drag link (19) that in turn is pivotably connected to a steering arm (20). The steering arm is secured to the spindle (14) of the right side wheel to allow control movement of the right side wheel. The steering gear is engaged for operation to a driver steering wheel (21) through and intermediate steering shaft (22).

19 Claims, 7 Drawing Sheets

LEFT HAND DRIVE

LEFT HAND DRIVE VEHICLE

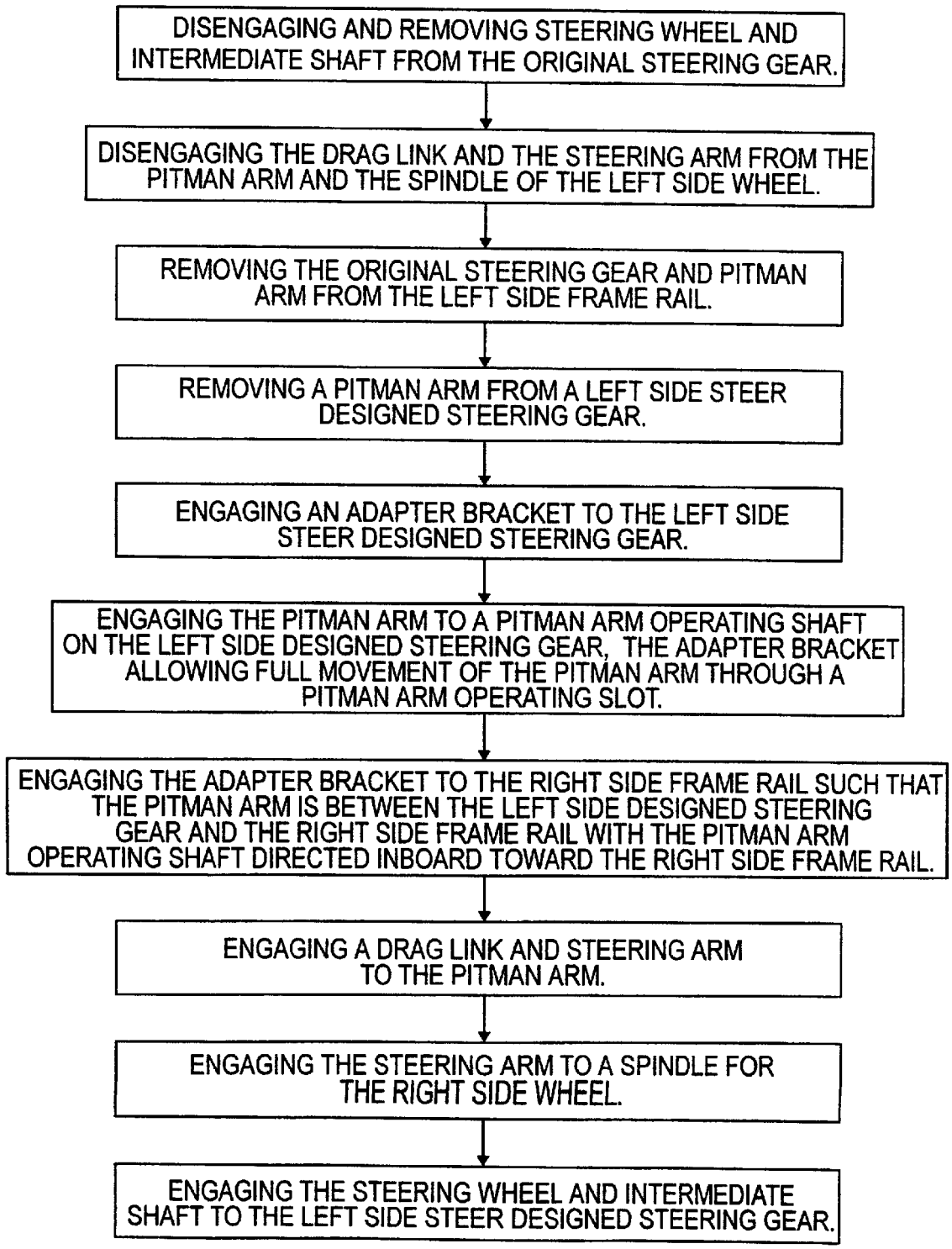

RIGHT HAND DRIVE STEERING SYSTEM AND CONVERSION METHOD FROM LEFT HAND DRIVE VEHICLE

RELATED APPLICATION

This document is a non-provisional patent claiming priority of U.S. Provisional Patent Application Ser. No. 60/113,445, filed Dec. 23, 1998.

BACKGROUND OF THE INVENTION

This invention relates to a right hand drive vehicle steering system that may be factory built or converted from a left-hand drive steering system and the method of conversion from left hand drive to right hand drive or vice versa. The system is particularly applicable to Cab Over Engine (COE) trucks although will work with most mobile vehicles.

The system of this invention uses an existing left-hand drive steering gear for the right side of the vehicle. The pitman arm that directs the wheel direction of steering is outboard of the steering gear for left hand drive applications and inboard of the steering gear for right hand drive applications. Because the gear is designed for left-hand drive use, it is not easily mounted on the right side of the vehicle. A steering gear adapter bracket is needed to mount the left-hand drive designed steering gear on the right side of the vehicle. The steering gear adapter bracket may be mounted to a vehicle radiator-mounting bracket also located on the chassis.

THE PRIOR ART

Prior to this invention, engineers designed cab-over-engine (COE) trucks as either right hand drive or left hand drive. If a customer in a right hand drive country wanted a COE truck manufactured in a left-hand drive country such as the United States of America, the COE would have to be laboriously converted either prior to or after export. For COE trucks where geometry and positioning of components is critical, the results of such steering system conversions were unsatisfying and not particularly efficient. Internal strains on the steering gears made for a 'harder' steering vehicle. In at least one configuration, a right side frame rail of the chassis of the vehicle had to be trimmed thereby reducing the overall structural integrity of the vehicle. An additional obstacle in the conversion of left hand drive vehicles to right hand drive is that the original design of the vehicles sometimes did not account for the possibility of conversion. Specifically, components were located asymmetrically toward the side not designed for the steering gear and steering wheel to take advantage of this volume. As a result, the conversion to steer from this side not designed for steering is complicated by the asymmetrical location of some components. In some Cab-Over-Engine trucks, components asymmetrically installed include a radiator for engine cooling, shifted to the right side of the vehicle for left hand drive vehicles and dashboard components.

SUMMARY OF THE INVENTION

Accordingly, a primary object of this invention is to provide a method for converting a left hand drive vehicle into a right hand drive vehicle, or vice a versa, in a fashion that provides an essentially equal steering ease of the vehicle as from before the conversion. Additionally, a secondary object of the invention is to provide a method for converting a left hand drive vehicle into a right hand drive vehicle, or vice a versa, without reducing the structural integrity of the chassis of the vehicle. An additional object of the invention is provide a right hand drive vehicle converted from a left hand drive vehicle which accounts for asymmetrical location of components in the originally designed vehicle. A fourth object of the invention is to be able to convert a left hand drive vehicle to a right hand drive vehicle using a left hand drive designed steering gear.

The method and resulting vehicle of this invention satisfies all of the objects of the invention. Specifically, the method of conversion involves removal of left-hand drive steering components. A left-hand drive designed steering gear is engaged to an adapter bracket. The adapter bracket allows the orientation of the left-hand drive designed steering gear to remain the same in a right hand drive installation as when installed in left-hand drive. As a result, the pitman arm that directs the wheel direction of steering and is outboard of the steering gear for left hand drive applications, is inboard of the steering gear for right hand drive applications. The adapter bracket allows displacement of the steering column and associated steering equipment to further outboard in the right hand drive system relative to the outboard position in left hand drive applications. This accounts for the asymmetrical location of components in the originally designed vehicle. The adapter bracket allows pitman arm operation through an operating slot in spite of the location of the pitman arm between the steering gear and the frame rail. A right side combination radiator and steering gear adapter mounting bracket may be installed to a front section of a right side frame rail for indirect mounting of the adapter plate to the frame or the adapter bracket may be mounted directly to the frame rail. In either case the adapter bracket and steering gear are mounted to the frame rail. The pitman arm is pivotably connected to a drag link that in turn is pivotably connected to a steering arm. The steering arm is secured to the spindle of the right side wheel to allow control movement of the right side wheel. The steering gear is engaged for operation to a right vehicle side driver steering wheel through an intermediate steering shaft.

BRIEF DESCRIPTION OF THE DRAWINGS

Other objects and advantages of the invention will become more apparent upon perusal of the detailed description thereof and upon inspection of the drawings in which:

FIG. 17 is a flow chart depicting the basic method of conversion of a steering system in accordance with this invention.

DESCRIPTION OF THE PREFERRED EMBODIMENT

Figure 1:
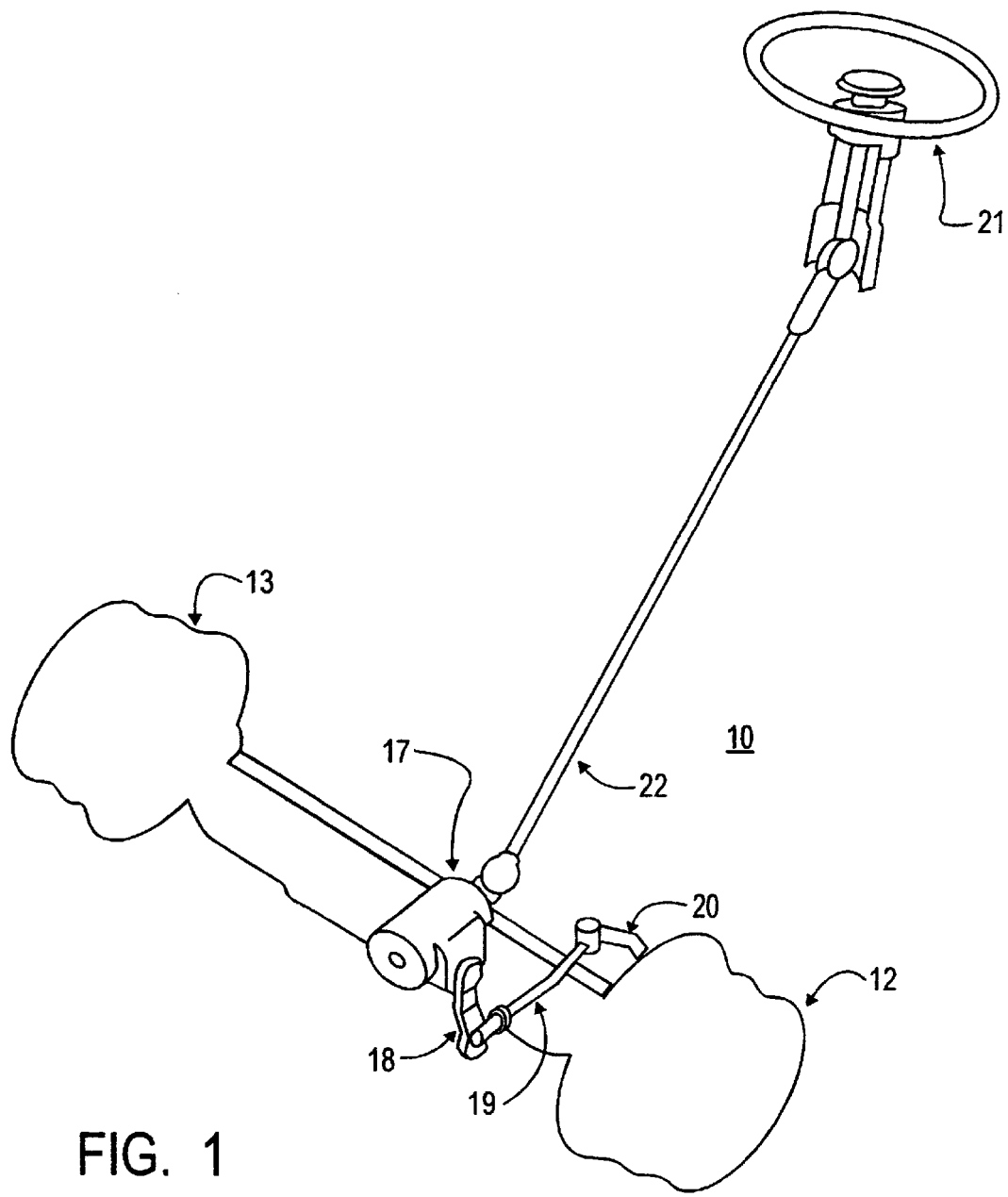
FIG. 1 is a schematic drawing of a prior art left-hand drive mobile vehicle steering system provided for comparison and for showing the initial state prior to conversion to right-hand drive.
Figure 2:
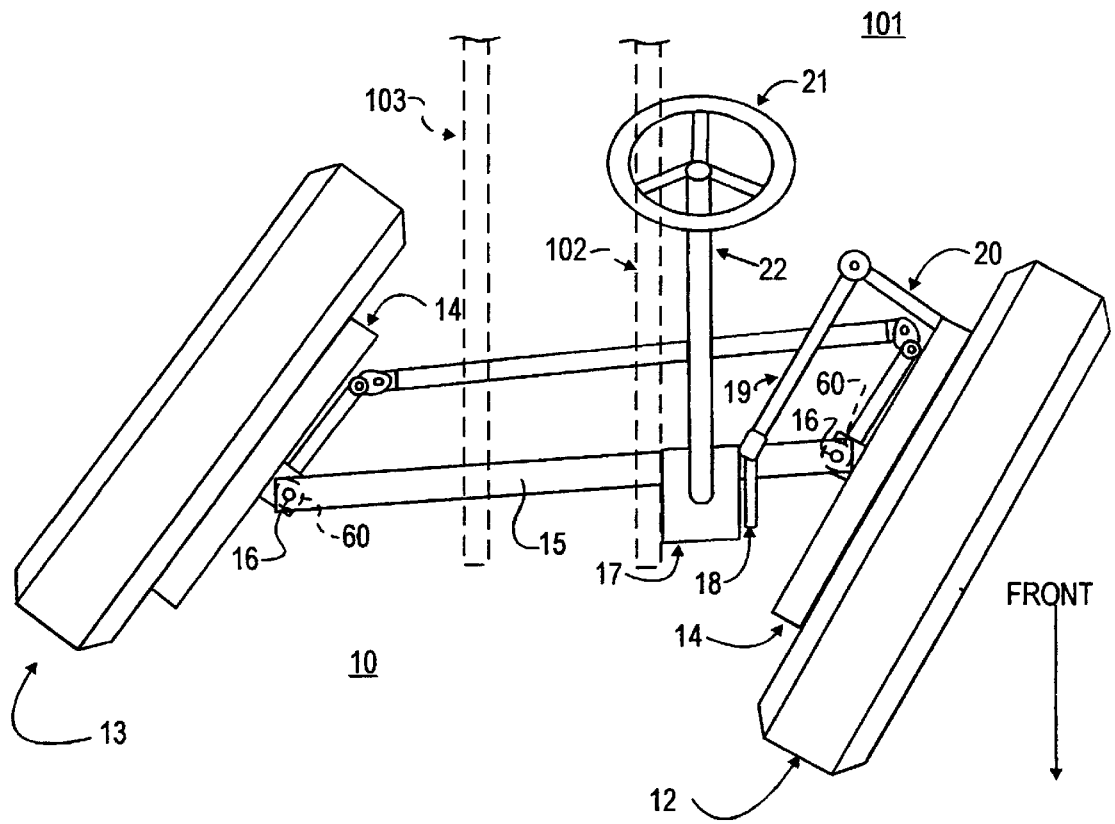
FIG. 2 is a top view of the mobile vehicle steering system of FIG. 1.
Figure 3:
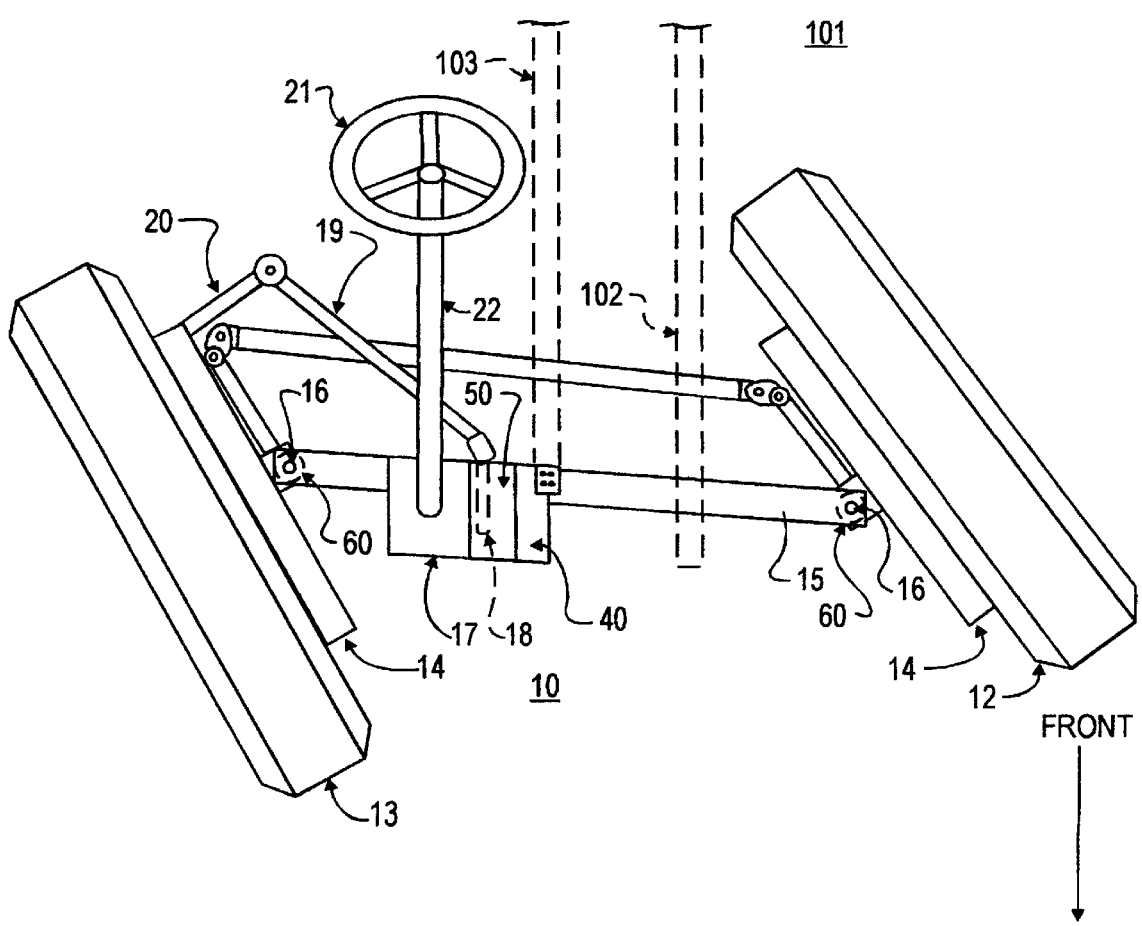
FIG. 3 is a top view of the mobile vehicle steering system of FIG. 2, converted to right-hand drive in accordance with this invention.
Figure 4:
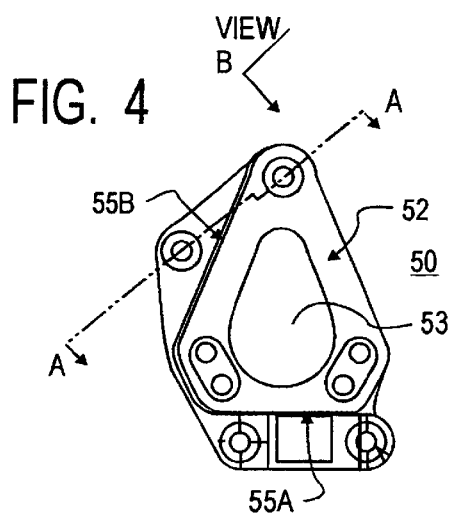
FIG. 4 is a steering gear side of an adapter bracket for conversion of a steering system as shown in FIG. 3 made in accordance with this invention.
Figure 5:
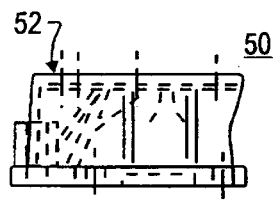
FIG. 5 is an upper side of the adapter bracket shown in FIG. 4.
Figure 8:
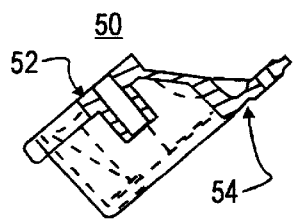
FIG. 8 is A—A of the adapter bracket of FIG. 4.
Figure 7:
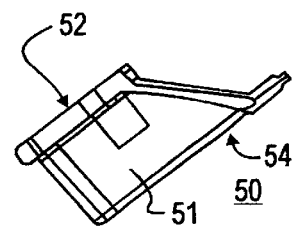
FIG. 7 is view B of the adapter bracket of FIG. 4.
Figure 6:
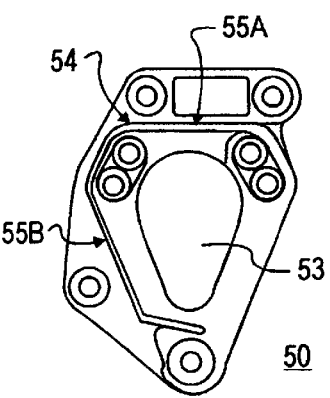
FIG. 6 is a frame mounting side of the adapter bracket of FIG. 4.
Figure 9:
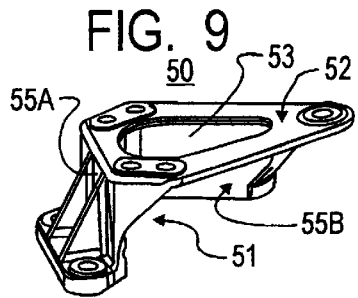
FIG. 9 is a perspective view of looking toward an operating slot of the adapter bracket of FIG. 4.
Figure 10:
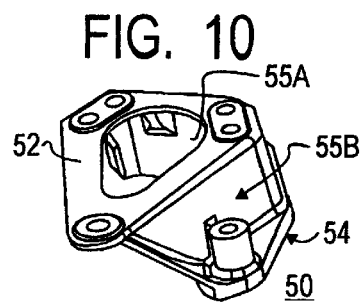
FIG. 10 is top perspective of looking toward an operating slot of the adapter bracket of FIG. 4.

Referring now to the drawings in greater detail there is illustrated in FIGS. 1 and 2, a left hand drive prior art vehicle steering system 10 of a vehicle 101. The vehicle 101 has a chassis comprised of at least a left side frame rail 102 and a right side frame rail 103. Various components of the vehicle including an engine and a steering gear 17 are mounted to the chassis frame rails. The steering system 10 may be converted to a right hand drive steering system 10 as shown in FIG. 3 in accordance with this invention. A left side wheel 12 and a right side wheel 13 are shown rotatably mounted on wheel spindles 14 pivotably mounted to opposite ends of an axle beam 15 through king pins 16. The axle beam 15 is engaged to the frame rails 102 and 103 through a front suspension system. The steering gear 17 rotates a pitman arm 18. The pitman arm 18 is pivotably connected to a drag link 19 that in turn is pivotably connected to a steering arm 20. The steering arm 20 is secured to the spindle 14 of the left side wheel 12 in FIGS. 1 and 2 and to the right side wheel 13 upon conversion in FIG. 3. The arrangement allows the pitman arm 18, drag link 19, and steering arm 20 combination to control movement of a driver side wheel, the left wheel 12 the left hand drive configuration and the right wheel 13 for the right hand drive configuration. The steering gear 17 is operated by a steering wheel 21 through an intermediate steering shaft 22. The steering gear 17 rmay be described as a left side steer designed steering gear because once the intermediate steering shaft 22 is engaged the steering gear 17, the pitman arm 18 is directed outward, the conventional direction, only when the steering gear is engaged to the left side frame rail 102. For conversion of a right side steer originally designed vehicle to a left side steer vehicle, the steering gear 17 would be described as a right side steer designed steering gear. The steering system 10 is a mechanical steering system and the power to operate the steering system 10 comes from the operator. The vehicle 101 has an engine and drive-train for making the vehicle 101 self propelled.

Although the invention described here is a right hand drive steering system converted from a left hand drive designed steering system and the method of conversion, a left hand drive steering system may be converted from a similarly designed right hand drive system. The main components of the converted steering system 10 are: the steering gear 17; the pitman arm 18, drag link 19, and steering arm 20 combination; the steering wheel 21; the intermediate shaft 22; and an adapter bracket 50. The adapter bracket 50 is shown installed in FIG. 3. FIGS. 4 to 10 show one embodiment of the adapter bracket 50. The adapter bracket 50 may be mounted directly to the right side frame rail 103 or indirectly mounted to the right side frame rail 103 through a combination radiator and steering gear adapter-mounting bracket 40. The combination radiator and steering gear adapter-mounting bracket 40 is shown installed in FIG. 3. FIGS. 12 to 16 show one embodiment of the combination radiator and steering gear adapter mounting bracket 40.

A central element of the conversion of one side drive to the other side drive in accordance with this invention is that in the originally designed steering configuration, the pitman arm 18 is directed outboard from the frame rail on the driver's side of the vehicle 101. The pitman arm 18 is free to move without obstruction. Upon conversion to an opposite side driven vehicle, the steering gear 17 maintains the same spatial alignment relative to ground on which the vehicle sits as in the original installation. However in the converted steering system 10, the same steering gear 17 in the same orientation causes the pitman arm 18 to be directed inboard towards the new driver's side frame rail. FIG. 3 illustrates how the pitman arm 18 is between the steering gear 17 and the drivers side frame rail, the right frame rail 103 for this conversion example. The adapter bracket 50 is required between the steering gear 17 and the new driver's side frame rail 103 to allow free movement of the pitman arm 18.

Figure 11A:
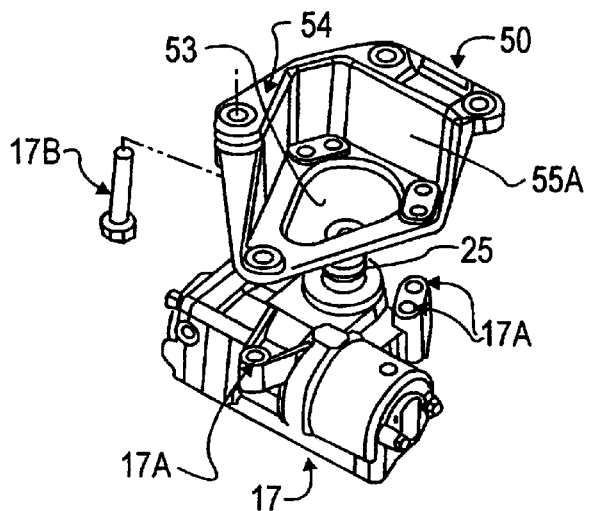
FIGS. 11 A–D shows four steps of assembly of the adapter bracket of FIG. 4 to a steering gear.
Figure 11B:
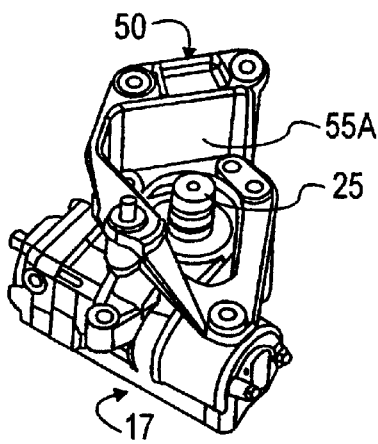
Figure 11C:
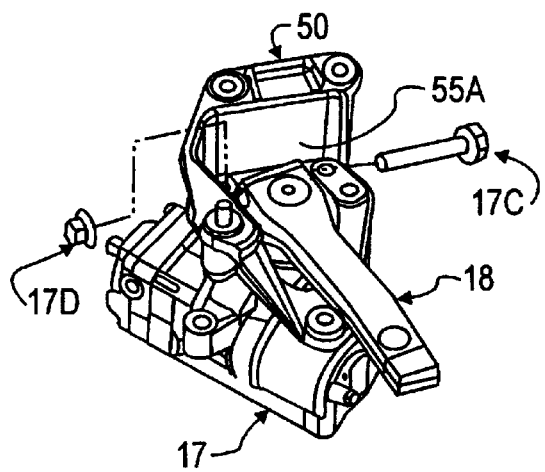
Figure 11D:
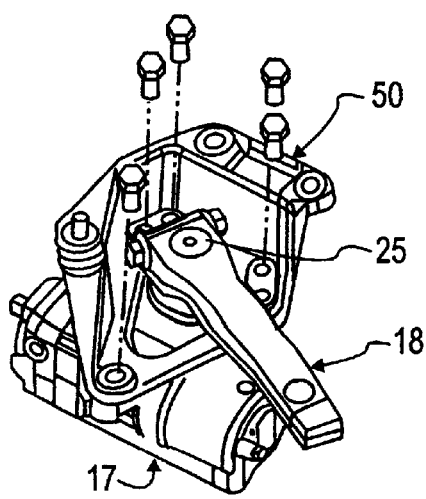
Figure 12:
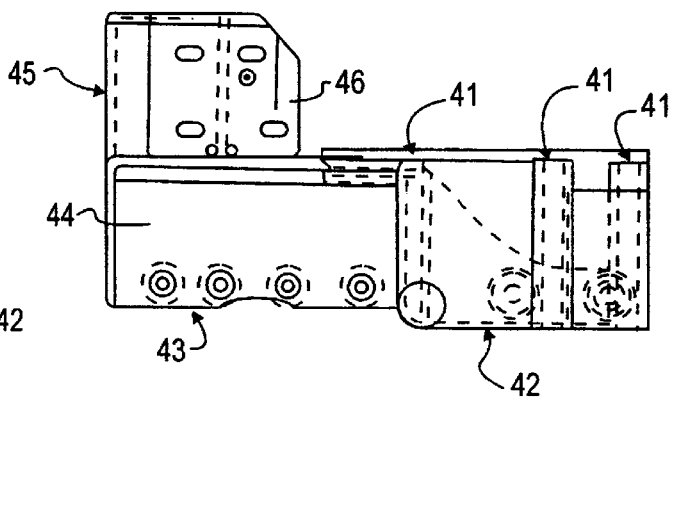
FIG. 12 is a top down view of a combination radiator and steering gear adapter-mounting bracket shown in FIG. 3.
Figure 15:
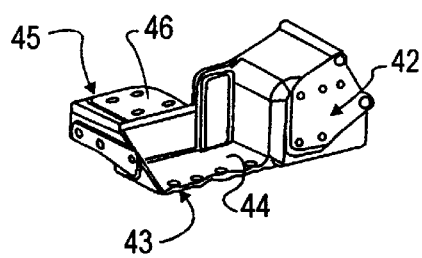
FIG. 15 is a side perspective of the combination radiator and steering gear adapter-mounting bracket shown of FIG. 12.
Figure 13:
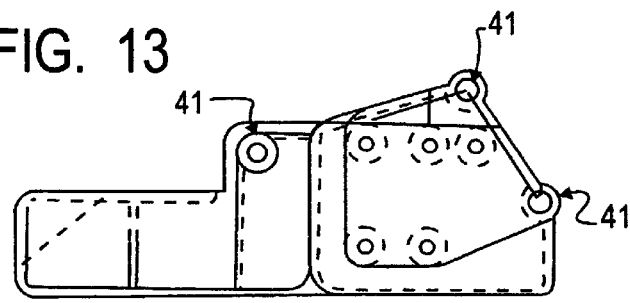
FIG. 13 is a side view of the combination radiator and steering gear adapter-mounting bracket shown of FIG. 12.
Figure 16:
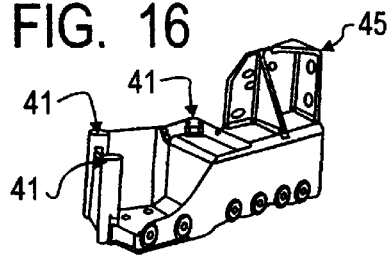
FIG. 16 is a bottom perspective of the combination radiator and steering gear adapter-mounting bracket shown of FIG. 12.
Figure 14:
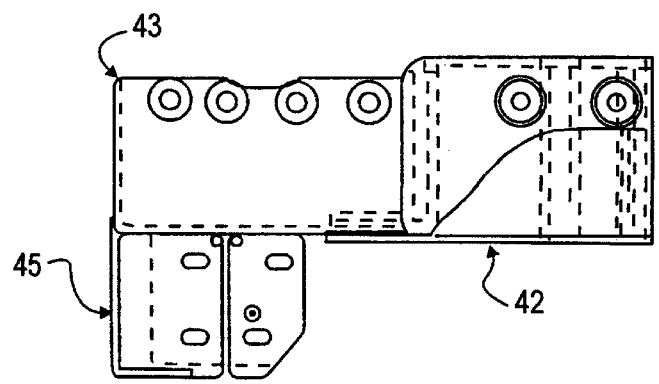
FIG. 14 is a bottom view of the combination radiator and steering gear adapter-mounting bracket shown of FIG. 12.

The adapter bracket 50 has a pitman arm operating slot 51. The adapter bracket 50 is engaged to the steering gear 17 through a steering gear engagement face 52 on the adapter bracket 50. The steering gear engagement face 52 has a pitman arm through slot 53 for allowing insertion of a pitman arm-operating shaft 25 as shown in FIGS. 11A and 11B. The adapter bracket 50 has a chassis engagement face 54 for engagement directly or indirectly to a chassis component such as a frame rail. The chassis engagement face 54 is displaced from the steering gear engagement face 52 by at least two displacement walls 55A and 55B. The displacement walls 55A and 55B define the pitman arm-operating slot 51 at such an angle to allow full movement of the pitman arm 18. As shown in FIGS. 11A to 11D, the adapter bracket 50 is moved towards the steering gear 17 such that the steering gear engagement face 52 partially aligns with one of a number of blind holes 17A on the steering gear. A first conventional fastener 17B is used to partially engage the adapter bracket 50 to the steering gear 17. In one embodiment of the method of assembly shown in FIG. 11B, the adapter bracket 50 is rotated slightly, to allow installation of the pitman arm 18 to the pitman arm operating shaft 25 using an engagement pin 17C and nut 17D. Following installation of the pitman arm 18 to the pitman arm operating shaft 25, the adapter bracket 50 is rotated to complete alignment of the steering gear operating face 52 with the blind holes of the steering gear 17. Second conventional fasteners 17E are installed to complete engagement of the adapter bracket 50 to the steering gear 17.

In one embodiment (not shown), the adapter bracket 50 is installed directly to the new driver side frame rail 103 using additional conventional fasteners. The chassis engagement face 54 is directly engaged to the frame rail 103. In the embodiment shown in FIG. 3, a combination radiator and steering gear adapter-mounting bracket 40 is installed to the new driver side frame rail 103. The combination radiator and steering gear adapter-mounting bracket 40 has engagement bosses 41. The adapter bracket 50 is engaged directly to the engagement bosses 41 through the additional conventional fasteners. The combination radiator and steering gear adapter-mounting bracket 40, where used, has a chassis engagement surface 42 that is engaged to the frame rail 103. The combination radiator and steering gear adapter-mounting bracket 40 may additionally act as a support for a radiator of the vehicle 101 and as a support for a cab tilt bracket for a cab-over-engine vehicle 101. Where the combination radiator and steering gear adapter mounting bracket 40 acts as a radiator support, there is a radiator support extension 43. The radiator support extension 43 has a radiator mounting surface 44. Where the combination radiator and steering gear adapter-mounting bracket 40 acts as a support for a cab tilt bracket, there is a cab tilt bracket support extension 45. The cab tilt bracket support extension 45 has a tilt bracket mounting surface 46.

The method for converting a left hand drive steering system on the vehicle 101 from a right hand drive steering system or vice versa may be described with the steps as follows and as shown in FIG. 17. The left hand drive designed steering gear 17, the pitman arm 18, the drag link 19, and steering arm 20 combination; the steering wheel 21; and the intermediate shaft 22 are removed from the vehicle 101. The radiator may need to be suspended separately or removed. The adapter bracket 50 is engaged to the steering gear 17. The adapter bracket 50 is may be engaged directly to the right side frame rail 103. The alternative step is that the combination radiator and steering gear adapter-mounting bracket 40 is installed to the right side frame rail 103. The adapter bracket 50 is then engaged to the combination radiator and steering gear adapter-mounting bracket 40. Where the combination radiator and steering gear adapter mounting bracket 40 is used and the device provides a support for the radiator or the cab tilt bracket, these devices will have to be separately supported during the installation of the combination radiator and steering gear adapter mounting bracket 40. The drag link 19, steering arm 20; the steering wheel 21 and the intermediate shaft 22 are then installed on the right side of the vehicle 101 as shown in FIG. 3.

As described above right hand drive vehicle 101 converted from a left hand drive vehicle or vice versa, and the method of conversion of the present invention provide a number of advantages, some of which have been described above, and others of which are inherent in the invention. Also, modifications may be proposed to the right hand drive vehicle 101 converted from a left-hand drive vehicle or vice versa, and the method of conversion without departing from the teachings herein. Accordingly, the scope of the invention is only to be limited as necessitated by the accompanying claims.

What is claimed is:

1. A method for converting a left side steered vehicle to a right side steered vehicle, the vehicle having a chassis with a right side frame rail and a left side frame rail, the vehicle having an axle beam engaged to the frame rails, the axle beam joining a right side wheel with a left side wheel, the vehicle having a steering system comprised of an original installed steering gear engaged to the left side frame rail, the steering gear having a rotatable pitman arm operated through a pitman arm operating shaft, the pitman arm directed outboard of both the original steering gear and the left side frame rail with the pitman arm operating shaft directed outboard relative to the left side frame rail, the pitman arm pivotably engaged to a drag link that is engaged to a steering arm, the steering arm pivotably engaged to a spindle of the left side wheel for steering the left side wheel, the original steering gear operable by a driver steering wheel through an intermediate steering shaft, comprising the steps of:

disengaging and removing steering wheel and intermediate shaft from the original steering gear;

disengaging the drag link and the steering arm from the pitman arm and the spindle of the left side wheel;

removing the original steering gear and pitman arm from the left side frame rail;

removing a pitman arm from a left side steer designed steering gear;

engaging an adapter bracket to the left side steer designed steering gear;

engaging the pitman arm to a pitman arm operating shaft on the left side designed steering gear, the adapter bracket allowing full movement of the pitman arm through a pitman arm operating slot;

engaging the adapter bracket to the right side frame rail such that the pitman arm is between the left side designed steering gear and the right side frame rail with the pitman arm operating shaft directed inboard toward the right side frame rail;

engaging a drag link and steering arm to the pitman arm;

engaging the steering arm to a spindle for the right side wheel; and engaging the steering wheel and intermediate shaft to the left side steer designed steering gear.

2. The method of claim 1, wherein:

the adapter bracket is engaged to the steering gear through a steering gear engagement face on the adapter bracket;

the steering gear engagement face has a pitman arm through slot for allowing insertion of a pitman arm-operating shaft;

the adapter bracket has a chassis engagement face for engagement to the right side frame rail;

the chassis engagement face is displaced from the steering gear engagement face by two displacement walls; and the displacement walls define the pitman arm-operating slot at such an angle to allow full movement of the pitman arm.

3. The method of claim 2, where in said steps of engaging an adapter bracket to the left side steer designed steering gear and of engaging the pitman arm to a pitman arm operating shaft on the left side designed steering gear, comprise:

moving the adapter bracket towards the steering gear such that the steering gear engagement face partially aligns with one of a number of blind holes on the steering gear;

partially engaging the adapter bracket to the steering gear with a first conventional fastener;

rotating the adapter bracket slightly to allow installation of the pitman arm to the pitman arm operating shaft using an engagement pin and nut;

rotating the adapter bracket to complete alignment of the steering gear operating face with the blind holes of the steering gear; and installing second conventional fasteners to complete engagement of the adapter bracket to the steering gear.

4. The method of claim 3, wherein said step of engaging the adapter bracket to the right side frame rail specifically comprises:

engaging the adapter bracket indirectly to the right side frame rail through an combination radiator and steering gear adapter mounting bracket, the combination radiator and steering gear adapter mounting bracket being engaged to the right side frame rail and the adapter bracket being engaged to the combination radiator and steering gear adapter mounting bracket.

5. The method of claim 4, wherein:

the combination radiator and steering gear adapter-mounting bracket has engagement bosses;

the adapter bracket is engaged directly to the engagement bosses through additional conventional fasteners; and the combination radiator and steering gear adapter-mounting bracket has a chassis engagement surface for engagement to the right side frame rail.

6. The method of claim 5, wherein:

the combination radiator and steering gear adapter mounting bracket has a radiator support extension; and the radiator support extension has a radiator mounting surface.

7. The method of claim 5, wherein:

the combination radiator and steering gear adapter-mounting bracket has a cab tilt bracket support extension; and the cab tilt bracket support extension has a tilt bracket mounting surface.

8. The method of claim 3, wherein said step of engaging the adapter bracket to the right side frame rail specifically comprises:

engaging the adapter bracket directly to the right side frame rail through additional conventional fasteners.

9. A method for converting a right side steered vehicle to a left side steered vehicle, the vehicle having a chassis with a left side frame rail and a right side frame rail, the vehicle having an axle beam engaged to the frame rails, the axle beam joining a right side wheel with a left side wheel, the vehicle having a steering system comprised of an original installed steering gear engaged to the right side frame rail, the steering gear having a rotatable pitman arm operated through a pitman arm operating shaft, the pitman arm directed outboard of both the original steering gear and the right side frame rail with the pitman arm operating shaft directed outboard relative to the right side frame rail, the pitman arm pivotably engaged to a drag link that is engaged to a steering arm, the steering arm pivotably engaged to a spindle of the right side wheel for steering the right side wheel, the original steering gear operable by a driver steering wheel through an intermediate steering shaft, comprising the steps of:

disengaging and removing steering wheel and intermediate shaft from the original steering gear;

disengaging the drag link and the steering arm from the pitman arm and the spindle of the right side wheel;

removing the original steering gear and pitman arm from the right side frame rail;

removing a pitman arm from a right side steer designed steering gear;

engaging an adapter bracket to the right side steer designed steering gear;

engaging the pitman arm to a pitman arm operating shaft on the right side designed steering gear, the adapter bracket allowing full movement of the pitman arm through a pitman arm operating slot;

engaging the adapter bracket to the left side frame rail such that the pitman arm is between the right side designed steering gear and the left side frame rail with the pitman arm operating shaft directed inboard toward the left side frame rail;

engaging a drag link and steering arm to the pitman arm;

engaging the steering arm to a spindle for the left side wheel; and engaging the steering wheel and intermediate shaft to the right side steer designed steering gear.

10. The method of claim 9, wherein:

the adapter bracket is engaged to the steering gear through a steering gear engagement face on the adapter bracket;

the steering gear engagement face has a pitman arm through slot for allowing insertion of a pitman arm-operating shaft;

the adapter bracket has a chassis engagement face for engagement to the left side frame rail;

the chassis engagement face is displaced from the steering gear engagement face by two displacement walls; and the displacement walls define the pitman arm-operating slot at such an angle to allow full movement of the pitman arm.

11. The method of claim 10, where in said steps of engaging an adapter bracket to the right side steer designed steering gear and of engaging the pitman arm to a pitman arm operating shaft on the right side designed steering gear, comprise:

moving the adapter bracket towards the steering gear such that the steering gear engagement face partially aligns with one of a number of blind holes on the steering gear;

partially engaging the adapter bracket to the steering gear with a first conventional fastener;

rotating the adapter bracket slightly to allow installation of the pitman arm to the pitman arm operating shaft using an engagement pin and nut;

rotating the adapter bracket to complete alignment of the steering gear operating face with the blind holes of the steering gear; and installing second conventional fasteners to complete engagement of the adapter bracket to the steering gear.

12. The method of claim 11, wherein said step of engaging the adapter bracket to the left side frame rail specifically comprises:

engaging the adapter bracket indirectly to the left side frame rail through an combination radiator and steering gear adapter mounting bracket, the combination radiator and steering gear adapter mounting bracket being engaged to the left side frame rail and the adapter bracket being engaged to the combination radiator and steering gear adapter mounting bracket.

13. The method of claim 12, wherein:

the combination radiator and steering gear adapter-mounting bracket has engagement bosses;

the adapter bracket is engaged directly to the engagement bosses through additional conventional fasteners; and the combination radiator and steering gear adapter-mounting bracket has a chassis engagement surface for engagement to the left side frame rail.

14. A mobile vehicle, comprising:

a chassis with a right side frame rail and a left side frame rail;

an axle beam engaged to said frame rails through a front suspension system;

said axle beam joins a right side wheel with a left side wheel;

an adapter bracket engaged to said right side frame rail;

a left side steer designed steering gear engaged to said adapter bracket such that a pitman arm of said left side steer designed steering gear is between said left side designed steering gear and said right side frame rail with the pitman arm operating shaft directed inboard toward said right side frame rail and allowing full movement of said pitman arm through a pitman arm operating slot in said adapter bracket;

said pitman arm pivotably engaged to a drag link;

said drag link engaged to a steering arm;

said steering arm pivotably engaged to a spindle of said right side wheel for steering said right side wheel; and said left side designed steering gear operable by a right vehicle side mounted driver steering wheel through an intermediate steering shaft.

15. The vehicle of claim 14, wherein:

said adapter bracket is engaged to said steering gear through a steering gear engagement face on said adapter bracket;

said steering gear engagement face has a pitman arm through slot for allowing insertion of a pitman arm-operating shaft;

said adapter bracket has a chassis engagement face for engagement to said right side frame rail;

said chassis engagement face is displaced from said steering gear engagement face by two displacement walls; and said displacement walls define said pitman arm-operating slot at such an angle to allow said full movement of said pitman arm.

16. The vehicle of claim 15, wherein:

said adapter bracket is engaged to said right side frame rail through a combination radiator and steering gear adapter-mounting bracket, said combination radiator and steering gear adapter mounting bracket engaged to said right side frame rail and said adapter bracket engaged to said combination radiator and steering gear adapter mounting bracket.

17. The vehicle of claim 15, wherein:

said combination radiator and steering gear adapter-mounting bracket has engagement bosses;

said adapter bracket is engaged directly to said engagement bosses through additional conventional fasteners; and said combination radiator and steering gear adapter-mounting bracket has a chassis engagement surface for engagement to said right side frame rail.

18. The vehicle of claim 17, wherein:

said combination radiator and steering gear adapter mounting bracket has a radiator support extension; and said radiator support extension has a radiator mounting surface.

19. The vehicle of claim 17, wherein:

said combination radiator and steering gear adapter-mounting bracket has a cab tilt bracket support extension; and said cab tilt bracket support extension has a tilt bracket mounting surface.

* * * * *

UNITED STATES PATENT AND TRADEMARK OFFICE
CERTIFICATE OF CORRECTION

PATENT NO.       : 6,276,476 B1                                          Page 1 of 1
APPLICATION NO.  : 09/529044
DATED            : August 21, 2001
INVENTOR(S)      : Joseph J. Farwell et al.

It is certified that error appears in the above-identified patent and that said Letters Patent is hereby corrected as shown below:

Please correct the following:
Title Page
(73) International Truck and Engine Corporation, Chicago, IL (US)

TRW Inc., Cleveland, OH (US)

Signed and Sealed this

Seventeenth Day of October, 2006

JON W. DUDAS
*Director of the United States Patent and Trademark Office*